US012779255B2

(12) United States Patent
Aleksovski

(10) Patent No.: US 12,779,255 B2
(45) Date of Patent: Nov. 3, 2026

(54) HARNESS FOR FALL PROTECTION SYSTEM

(71) Applicant: WERNER CO., Itasca, IL (US)

(72) Inventor: Daniel Aleksovski, Irondale, AL (US)

(73) Assignee: WERNER CO., Itasca, IL (US)

( * ) Notice: Subject to any disclaimer, the term of this patent is extended or adjusted under 35 U.S.C. 154(b) by 603 days.

(21) Appl. No.: 18/136,390

(22) Filed: Apr. 19, 2023

(65) Prior Publication Data

US 2023/0330456 A1 Oct. 19, 2023

Related U.S. Application Data

(60) Provisional application No. 63/332,420, filed on Apr. 19, 2022.

(51) Int. Cl.
*A62B 35/00* (2006.01)

(52) U.S. Cl.
CPC ...... *A62B 35/0018* (2013.01); *A62B 35/0025* (2013.01)

(58) Field of Classification Search
CPC .................................................. A62B 35/0018
See application file for complete search history.

(56) References Cited

U.S. PATENT DOCUMENTS 4,121,688 A * 10/1978 Lirakis ............... A62B 35/0037 182/3
5,878,833 A * 3/1999 Bell ..................... A62B 35/005 182/5
6,367,582 B1 * 4/2002 Derby ................ A62B 35/0037 182/7
6,374,946 B1 * 4/2002 Petzl .................. A62B 35/0018 182/7
7,673,945 B1 * 3/2010 Riffel ................. A62B 35/0025 297/483
8,292,028 B2 10/2012 Wise
8,482,401 B2 * 7/2013 Morino .............. A62B 35/0025 340/532

(Continued)

FOREIGN PATENT DOCUMENTS

DE 102015000078 A1 * 7/2016 ......... A62B 35/0006
EP 0508278 A1 * 10/1992 ......... A62B 35/0018

(Continued)

OTHER PUBLICATIONS

USPTO, "International Search Report and Written Opinion" for corresponding International (PCT) Patent Application No. PCT/US2023/065932, dated Nov. 22, 2023, 19 pp.

(Continued)

*Primary Examiner* — Theodore V Adamos
*Assistant Examiner* — Kathleen M. McFarland
(74) *Attorney, Agent, or Firm* — Michael Best & Friedrich, LLP

(57) ABSTRACT

A harness for a fall protection system includes a number of user initiated features structured to be activated by an action of a user, and a lockout system including fall indicator stitching structured to tear in response to a fall, wherein an element of a selected user initiated feature is attached to the fall indicator stitching such that the selected user initiated feature is unable to be activated by the action of the user until the fall indicator stitching is torn.

18 Claims, 13 Drawing Sheets

(56) References Cited

U.S. PATENT DOCUMENTS

| | | | | |
|---|---|---|---|---|
| 8,584,799 | B1 * | 11/2013 | Dennington | A62B 35/04 182/4 |
| 9,387,350 | B2 * | 7/2016 | Gopfert | A62B 35/0037 |
| 9,808,659 | B2 * | 11/2017 | Chevalier | A62B 35/0025 |
| 10,035,029 | B2 * | 7/2018 | Dawson | A62B 35/0012 |
| 10,413,762 | B2 * | 9/2019 | Patton | A62B 35/0037 |
| 10,702,723 | B2 * | 7/2020 | Quigley | B60R 22/28 |
| 11,129,423 | B2 * | 9/2021 | Zeppetella | A41D 13/0007 |
| 11,375,760 | B2 * | 7/2022 | Rutten | A62B 35/0025 |
| 12,145,010 | B2 * | 11/2024 | Dzugan | A62B 35/04 |
| 2005/0005343 | A1 * | 1/2005 | Johnson | F41H 1/02 2/102 |
| 2007/0209868 | A1 * | 9/2007 | Betcher | A62B 35/0025 182/3 |
| 2010/0025148 | A1 * | 2/2010 | Dawson | A62B 35/0012 182/3 |
| 2011/0090079 | A1 * | 4/2011 | Morino | A62B 35/0075 340/532 |
| 2012/0024627 | A1 * | 2/2012 | Harshbarger | A62B 35/0018 182/5 |
| 2013/0056302 | A1 * | 3/2013 | Bishop | A62B 35/0025 112/475.01 |
| 2013/0319793 | A1 * | 12/2013 | Stibilj | A62B 35/0012 182/3 |
| 2014/0034419 | A1 * | 2/2014 | Gopfert | A62B 35/0018 182/3 |
| 2014/0224583 | A1 * | 8/2014 | Wood | A62B 35/0031 182/6 |
| 2015/0217150 | A1 * | 8/2015 | Harris | A01M 31/02 182/5 |
| 2016/0206903 | A1 * | 7/2016 | Boothby | A62B 35/0018 |
| 2016/0332009 | A1 * | 11/2016 | Chevalier | A62B 35/0018 |
| 2017/0221338 | A1 * | 8/2017 | Pham | A62B 35/0025 |
| 2018/0161606 | A1 * | 6/2018 | Quigley | A62B 35/0012 |
| 2019/0118011 | A1 * | 4/2019 | Patton | F16G 11/12 |
| 2019/0216142 | A1 * | 7/2019 | Zeppetella | A62B 35/0037 |
| 2020/0206551 | A1 * | 7/2020 | Dzugan | A62B 35/0031 |
| 2021/0000192 | A1 * | 1/2021 | Rutten | A41D 13/02 |
| 2021/0178202 | A1 * | 6/2021 | Carroccia | A62B 35/0018 |
| 2023/0330456 | A1 * | 10/2023 | Aleksovski | A62B 35/0025 |
| 2024/0299784 | A1 * | 9/2024 | Carroccia | A62B 35/04 |

FOREIGN PATENT DOCUMENTS

| | | | | |
|---|---|---|---|---|
| EP | 0508278 | B1 * | 3/1997 | A62B 35/04 |
| EP | 1068880 | A1 * | 1/2001 | A62B 35/0018 |
| GB | 2591984 | A | 8/2021 | |
| JP | 6923197 | B2 * | 8/2021 | |
| WO | WO-2020039906 | A1 * | 2/2020 | A62B 35/00 |
| WO | 2021184280 | A1 | 9/2021 | |

OTHER PUBLICATIONS

Extended European Search Report for Application No. 23792737.1 dated Apr. 9, 2026 (8 pages).

* cited by examiner

HARNESS FOR FALL PROTECTION SYSTEM

CROSS REFERENCE TO RELATED APPLICATIONS

This application claims priority to U.S. Provisional Patent Application Ser. No. 63/332,420, filed Apr. 19, 2022, entitled HARNESS FOR FALL PROTECTION SYSTEM, which is incorporated in their entirety herein by reference.

BACKGROUND

Field

The disclosed concept relates generally to fall protection systems, and in particular, to a harness for use in fall protection systems.

Background Information

In fall protection systems, a worker typically wears a harness. Some types of harnesses include an attachment point, such as a D-ring, that is typically positioned on the back of the user and attaches to a lifeline in a fall protection system. There are various challenges related to the strength, safety, and ease of use of harnesses in fall protection systems. There remains room for improvement in the strength, safety, and ease of use of harnesses.

SUMMARY OF THE INVENTION

In accordance with an aspect of the disclosed concept, a harness for a fall protection system comprises: a number of user initiated features structured to be activated by an action of a user; and a lockout system including fall indicator stitching structured to tear in response to a fall, wherein an element of a selected user initiated feature are is into the fall indicator stitching such that the selected user initiated feature is unable to be activated by the action of the user until the fall indicator stitching is torn.

In accordance with an aspect of the disclosed concept, a harness for a fall protection system comprises: a first element; a second element; a third element; and a tri-load capable hardware attachment structured to attach the first element, the second element, and the third element, wherein the tri-load capable hardware attachment is structured to resist three directions of loading, wherein the tri-load capable hardware attachment includes a first webbing layer of the first element looped through an opening of the second element and an opening of the third element and a second webbing layer of the first element looped through the opening of the second element and the opening of the third element a first time and looped back through the opening of the second element a second time.

In accordance with an aspect of the disclosed concept, a harness for a fall protection system comprises: a torso strap composed of a plurality of layers of webbing; and a chest strap composed of at least one of the plurality of layers of webbing of the torso strap folded to be disposed perpendicular with respect to the remaining of the plurality of layers of webbing of the torso strap, wherein the at least one of the plurality of layers of webbing of the torso strap is folded at about 45 degrees with respect to the remaining of the plurality of layers of webbing of the torso strap.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
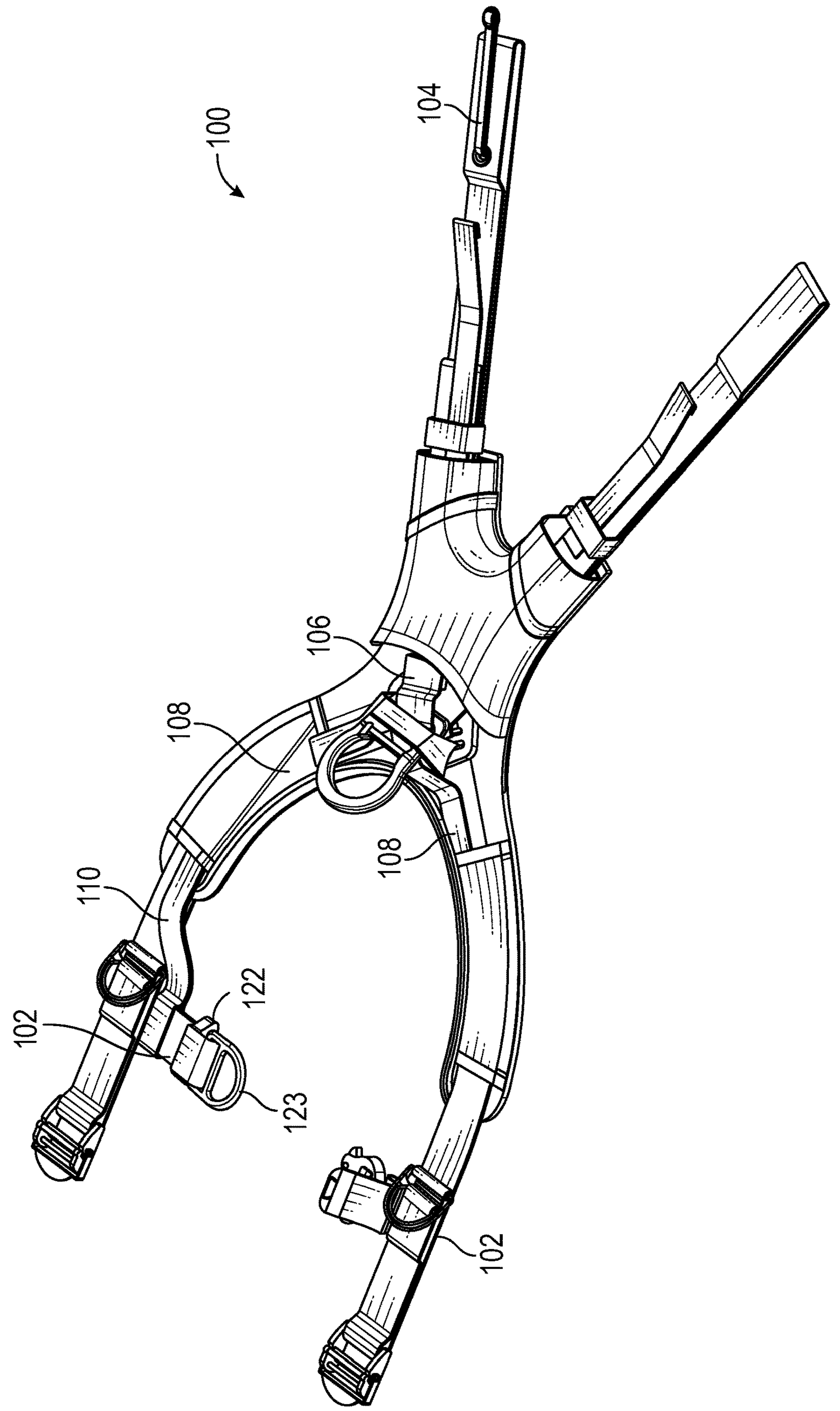
FIG. 1 is a view of the back of a portion of a harness in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Figure 2:
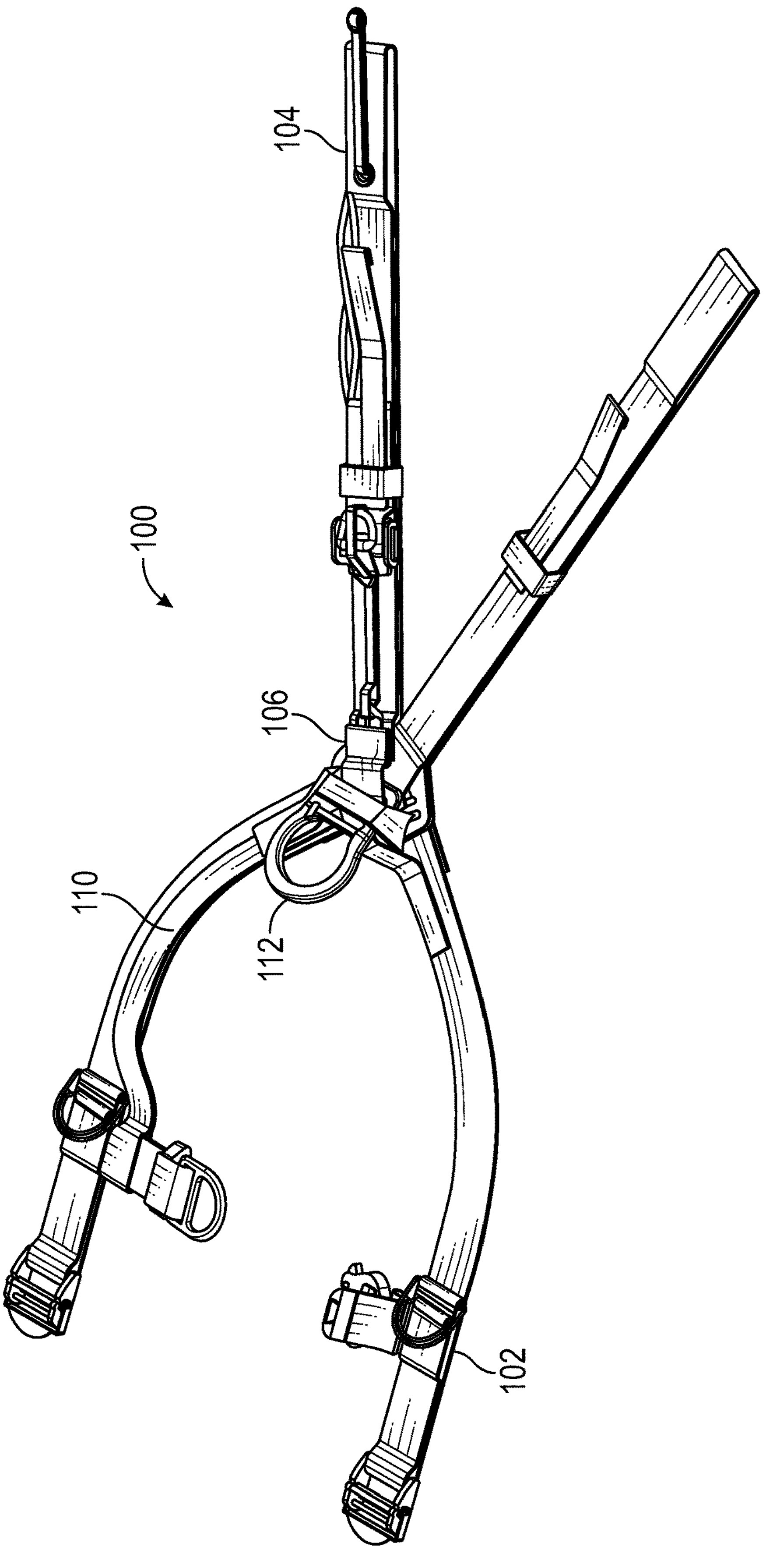
FIG. 2 is a view of the harness of FIG. 1 with protective covers removed.
Figure 5:
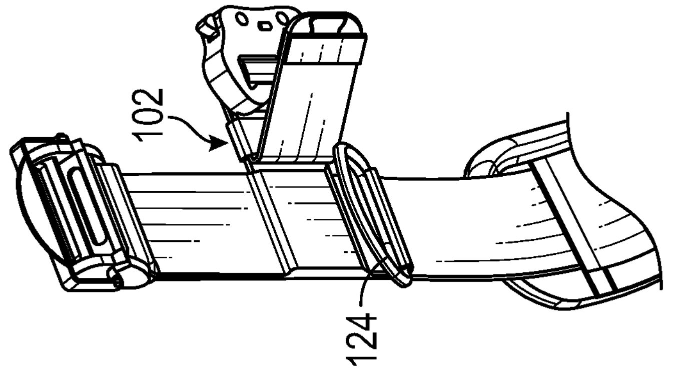
FIGS. 3-5 are views of a chest strap of a harness in accordance with an example embodiment of the disclosed concept.
Figure 4:
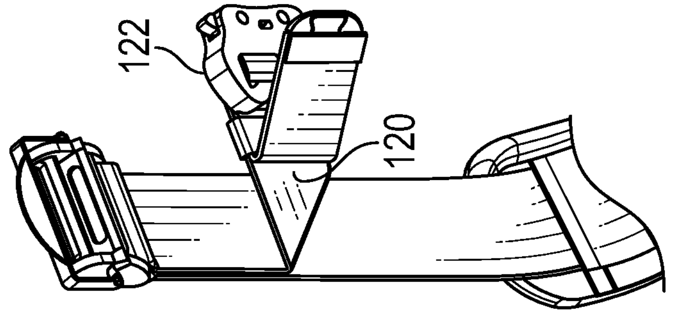
Figure 3:
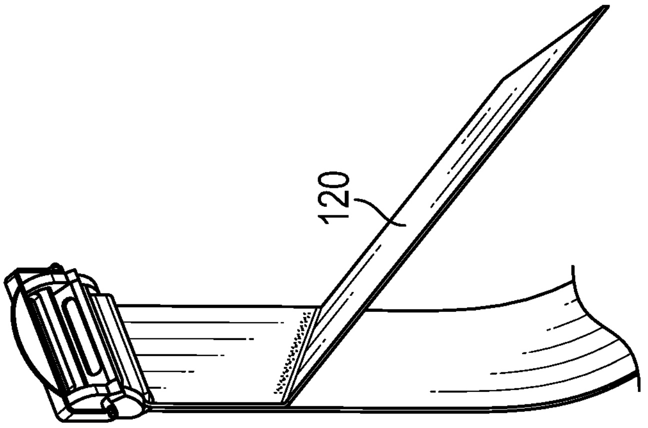
Figure 6:
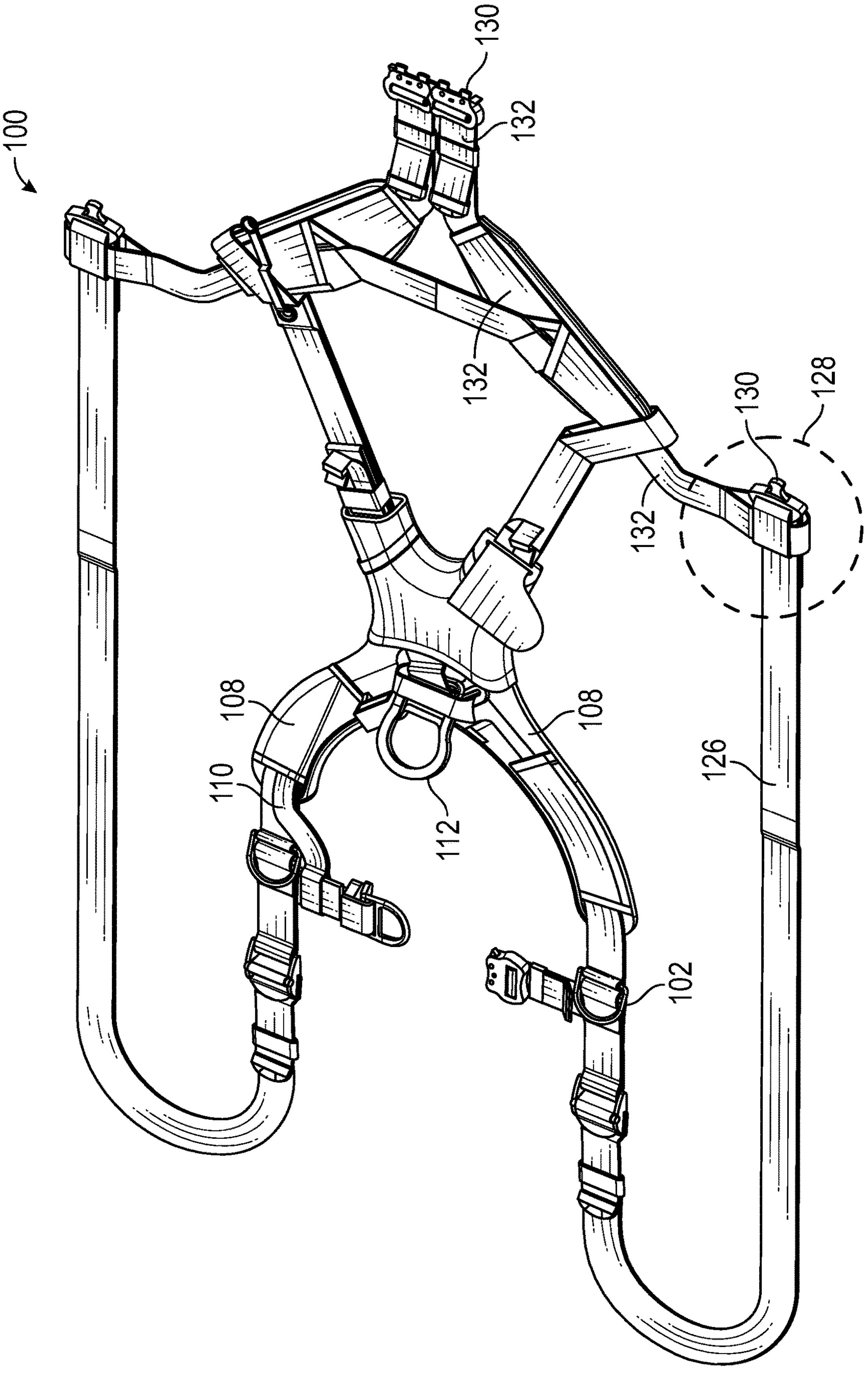
FIG. 6 is a view of a more complete harness in accordance with an example embodiment of the disclosed concept.
Figure 7B:
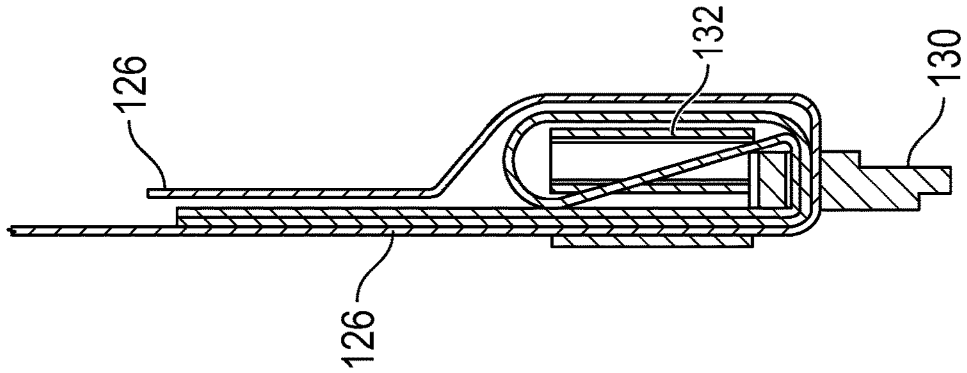
FIG. 7A-C are views of a torso strap to leg loop connection of a harness in accordance with an example embodiment of the disclosed concept.
Figure 7A:
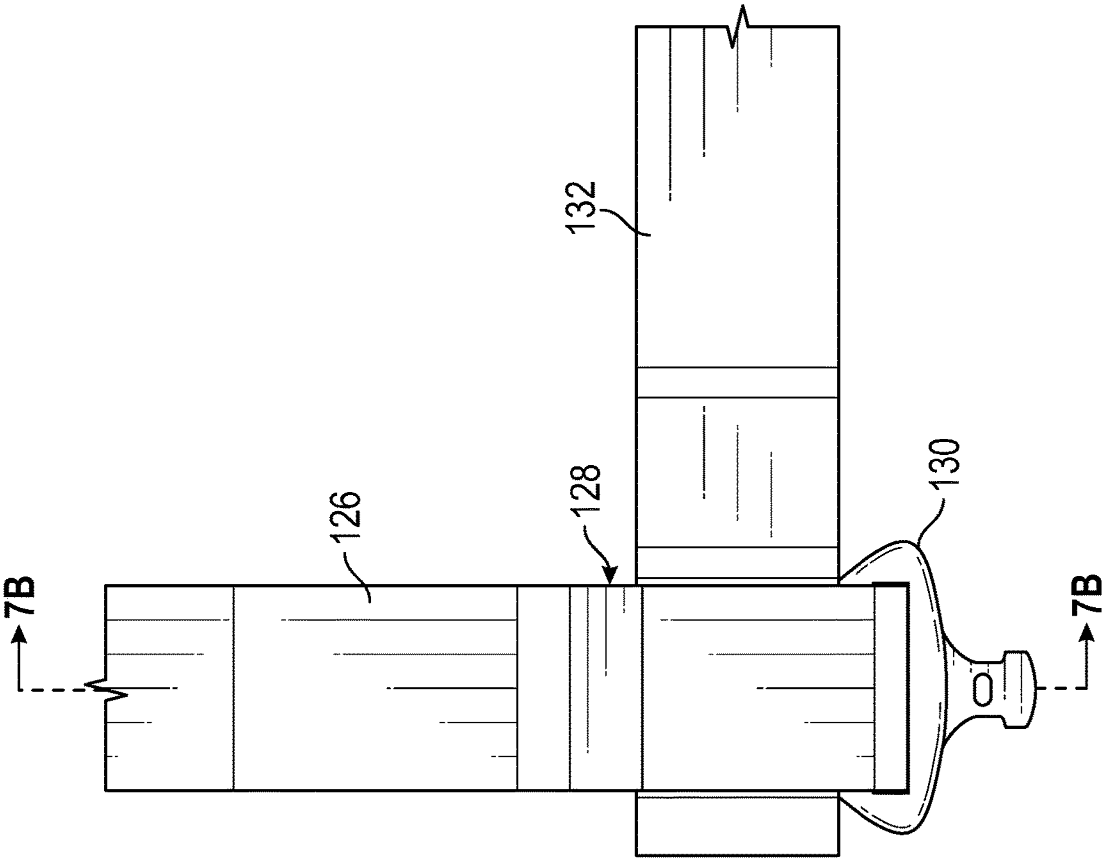
Figure 7C:
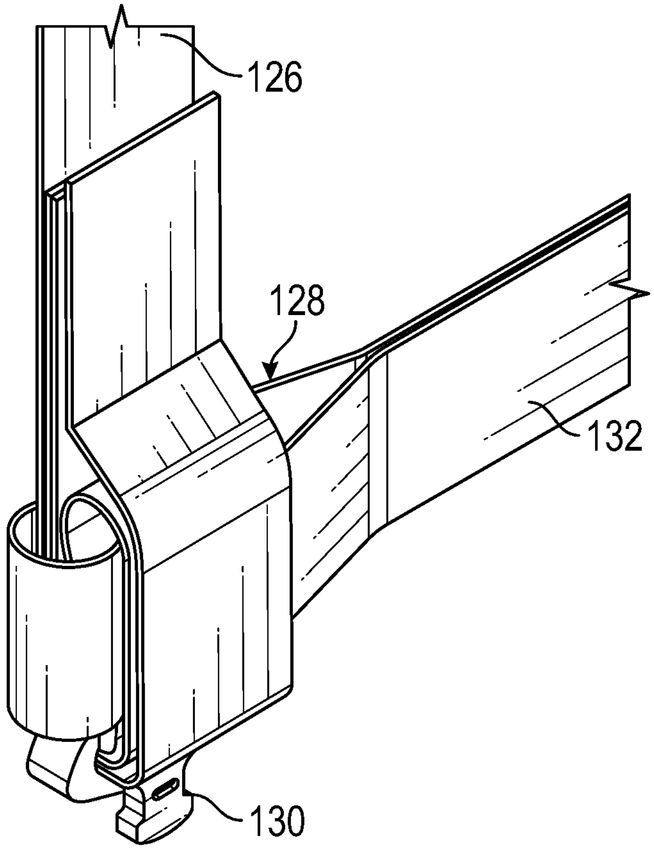
Figure 8:
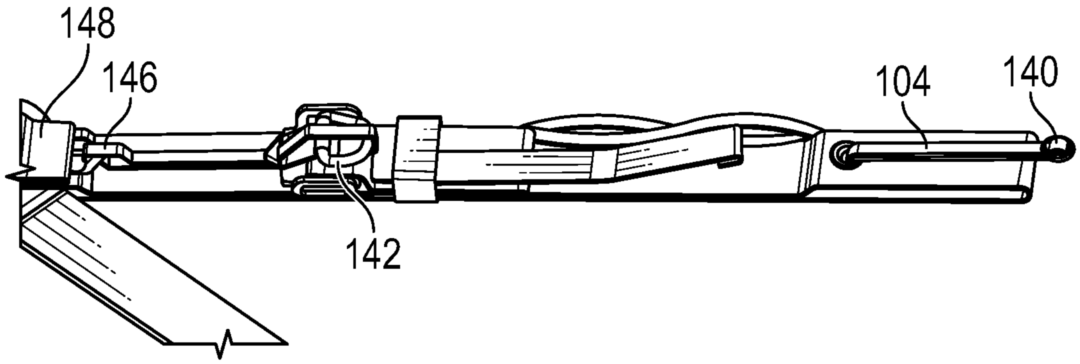
FIG. 8 is a view of a pull cord of a harness in accordance with an example embodiment of the disclosed concept.
Figure 9A:
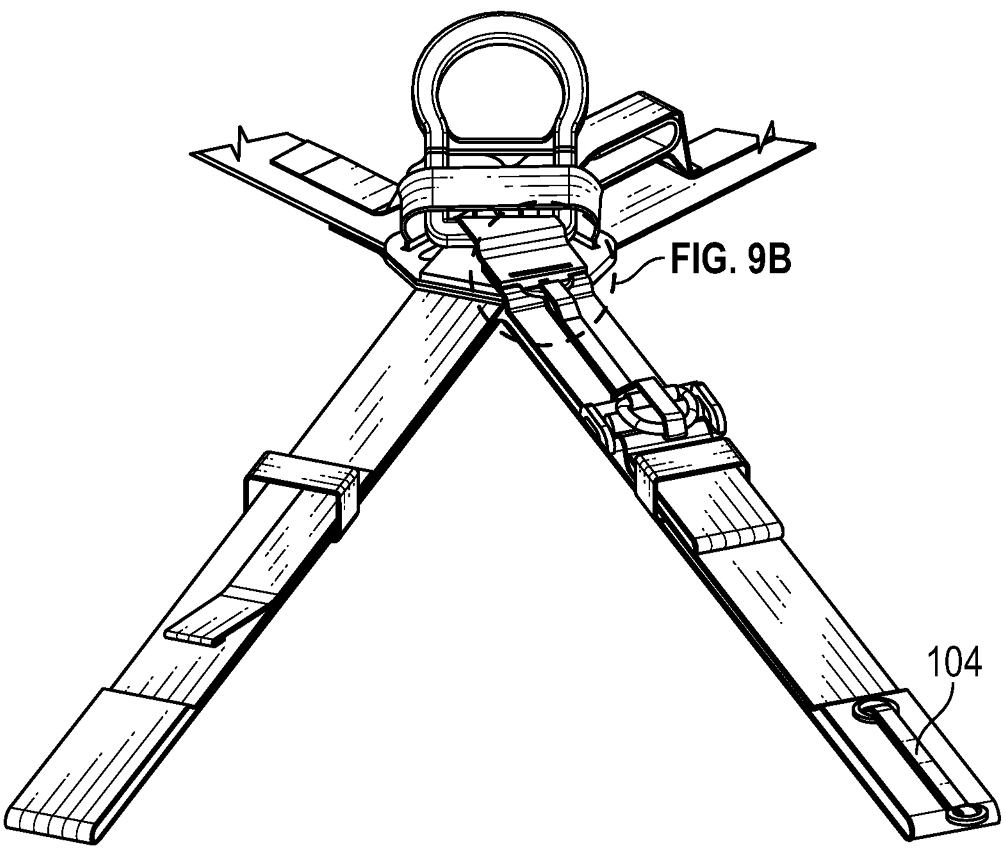
FIGS. 9A-B are views of a lockout system of a harness in accordance with an example embodiment of the disclosed concept.
Figure 9B:
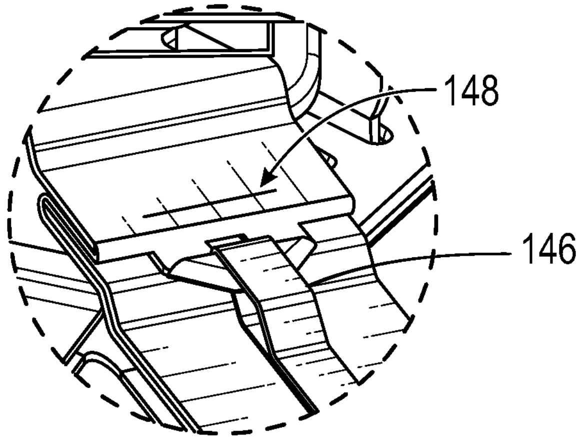
Figure 10A:
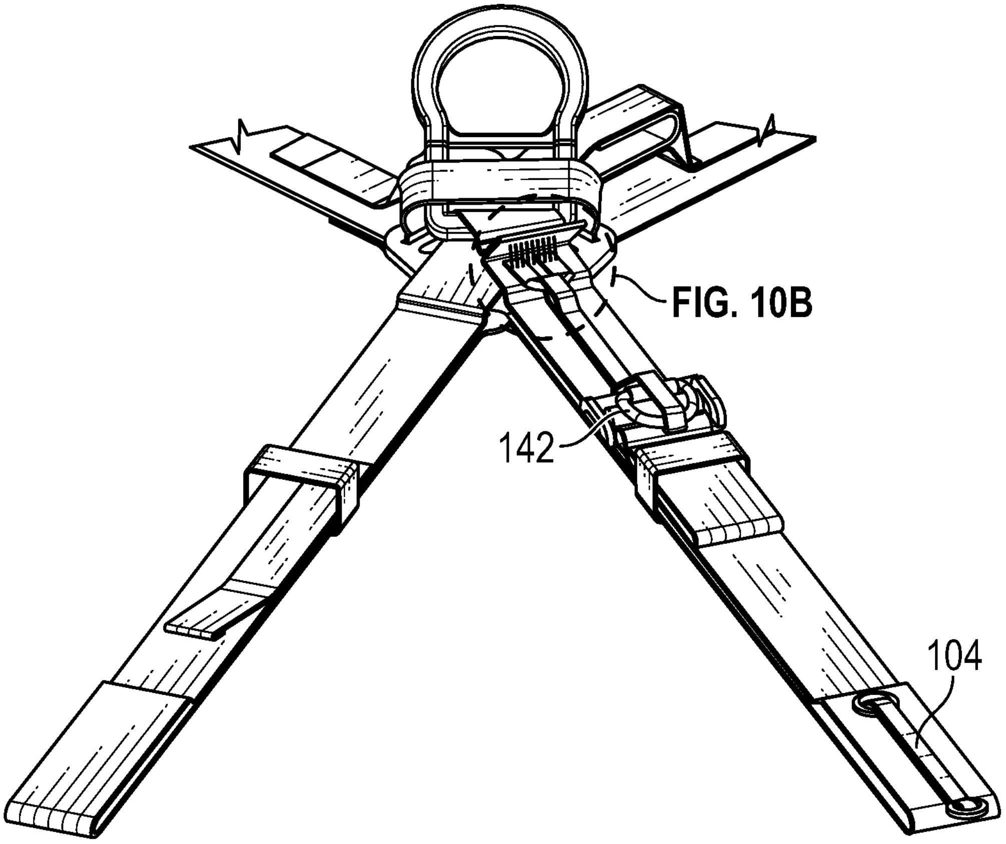
FIGS. 10A-B are additional views of a lockout system of a harness in accordance with an example embodiment of the disclosed concept.
Figure 10B:
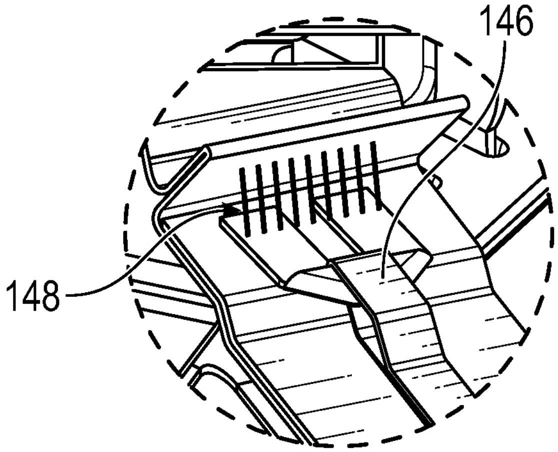
Figure 11A:
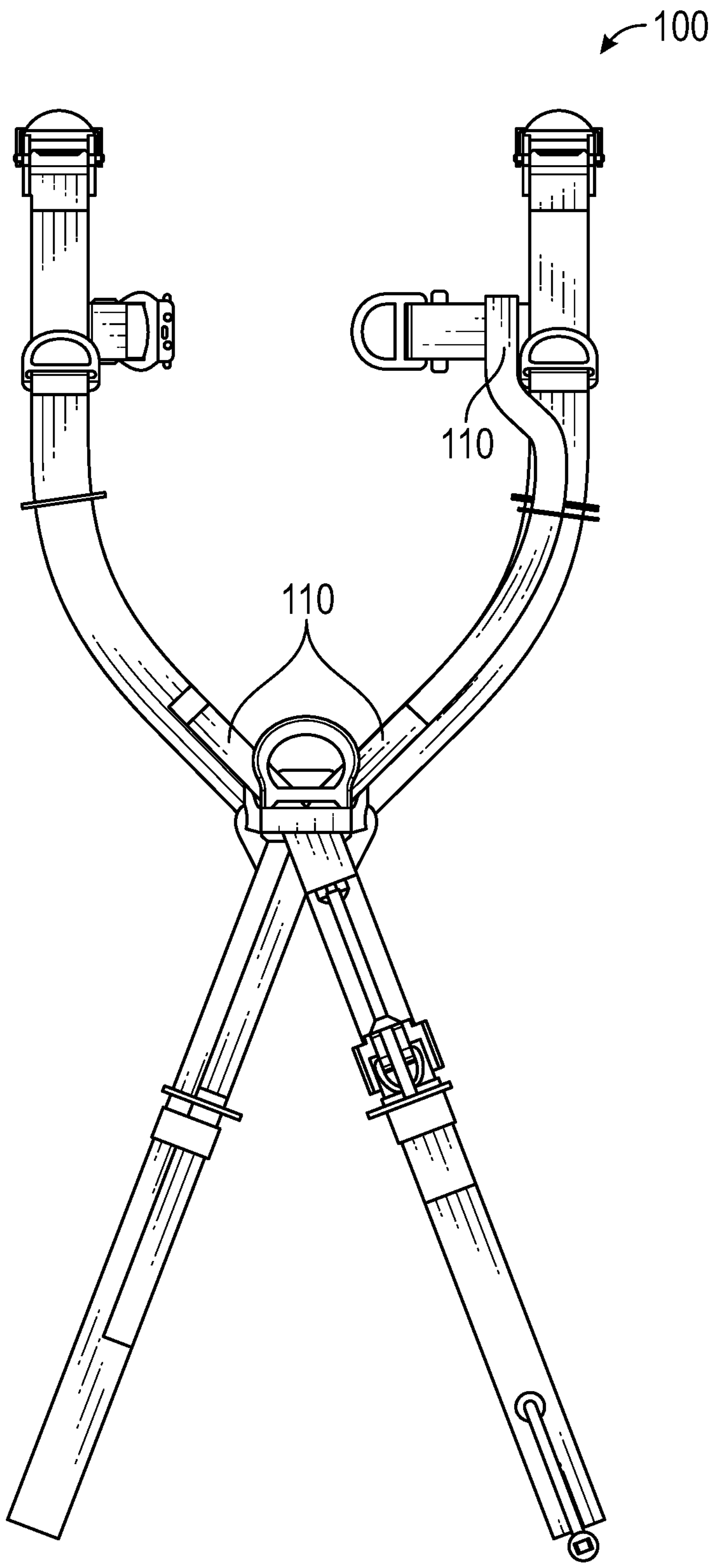
FIGS. 11A-B are views of tearaway stitching of a harness in accordance with an example embodiment of the disclosed concept.
Figure 11B:
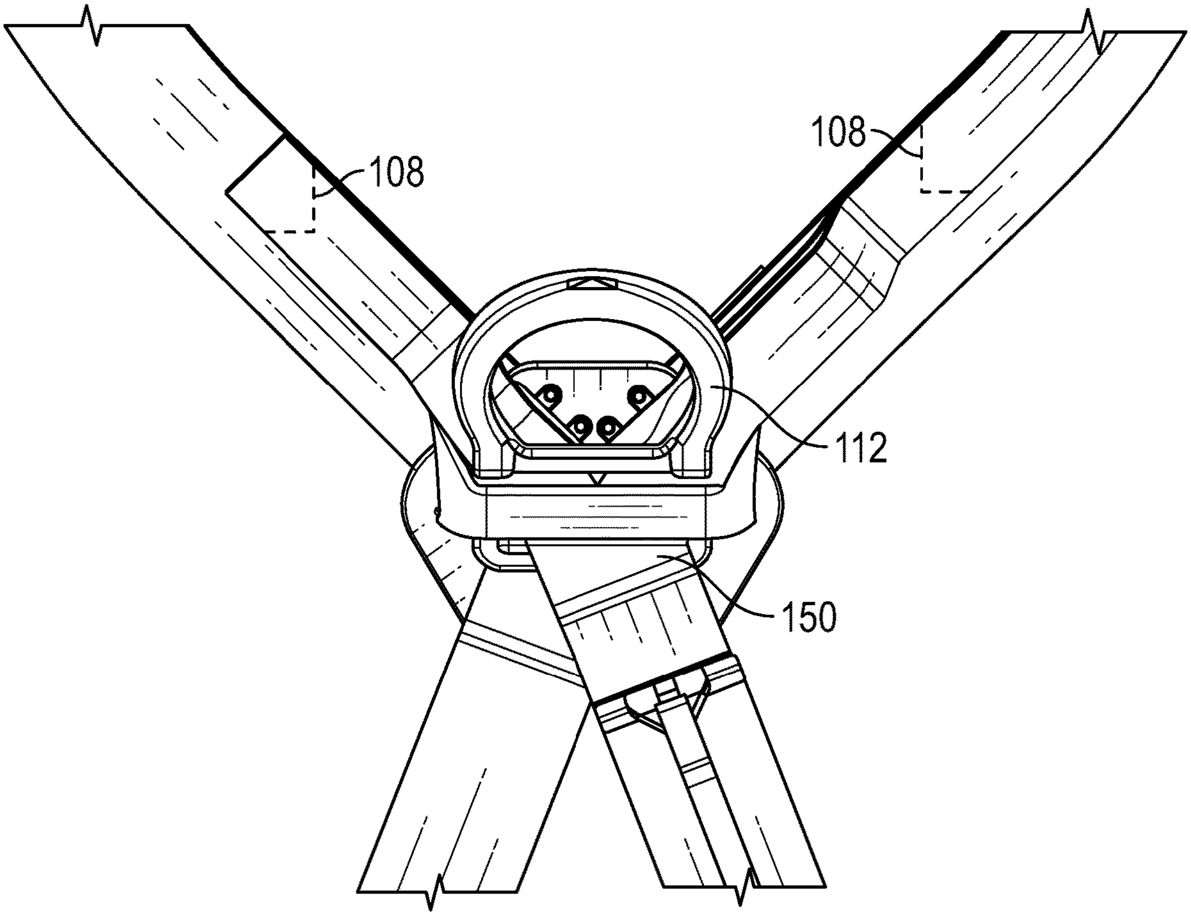
Figure 12A:
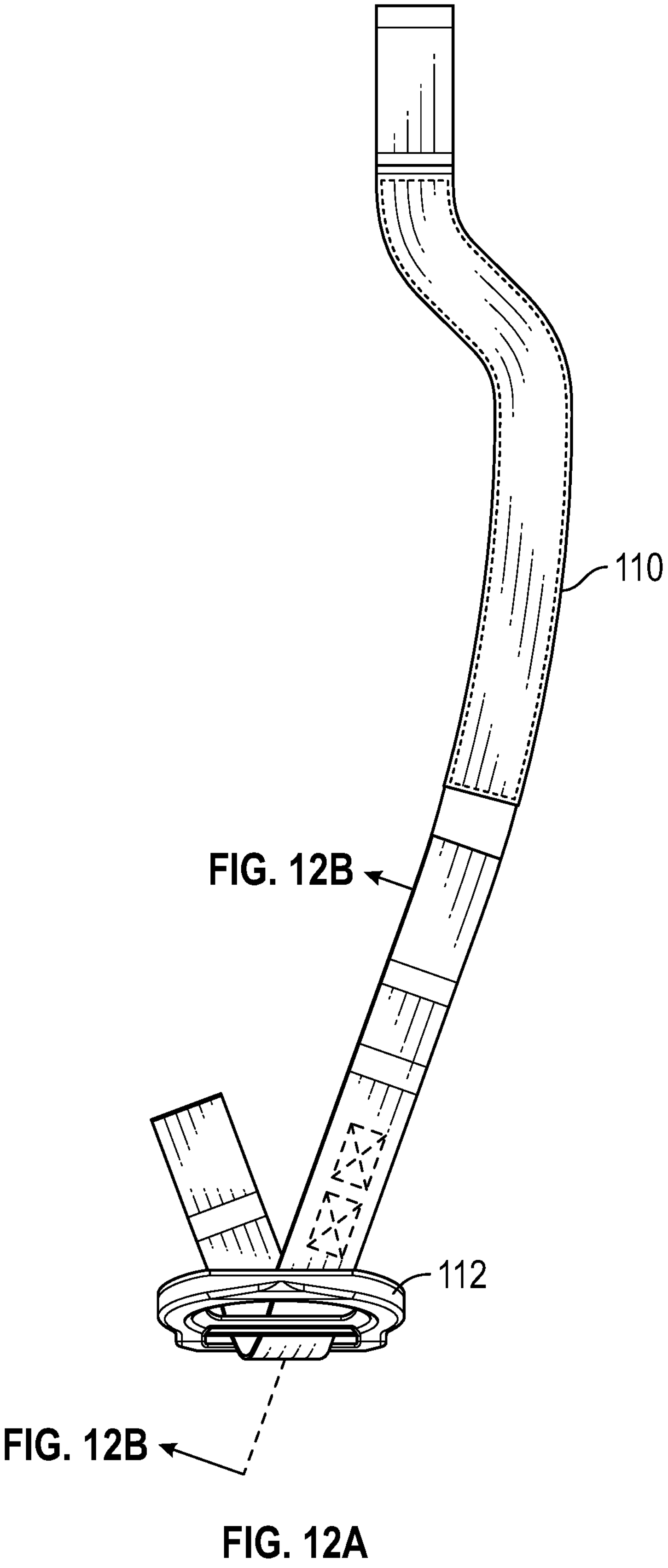
FIGS. 12A-C are views of a triple connection point lanyard of a harness in accordance with an example embodiment of the disclosed concept.
Figure 12B:
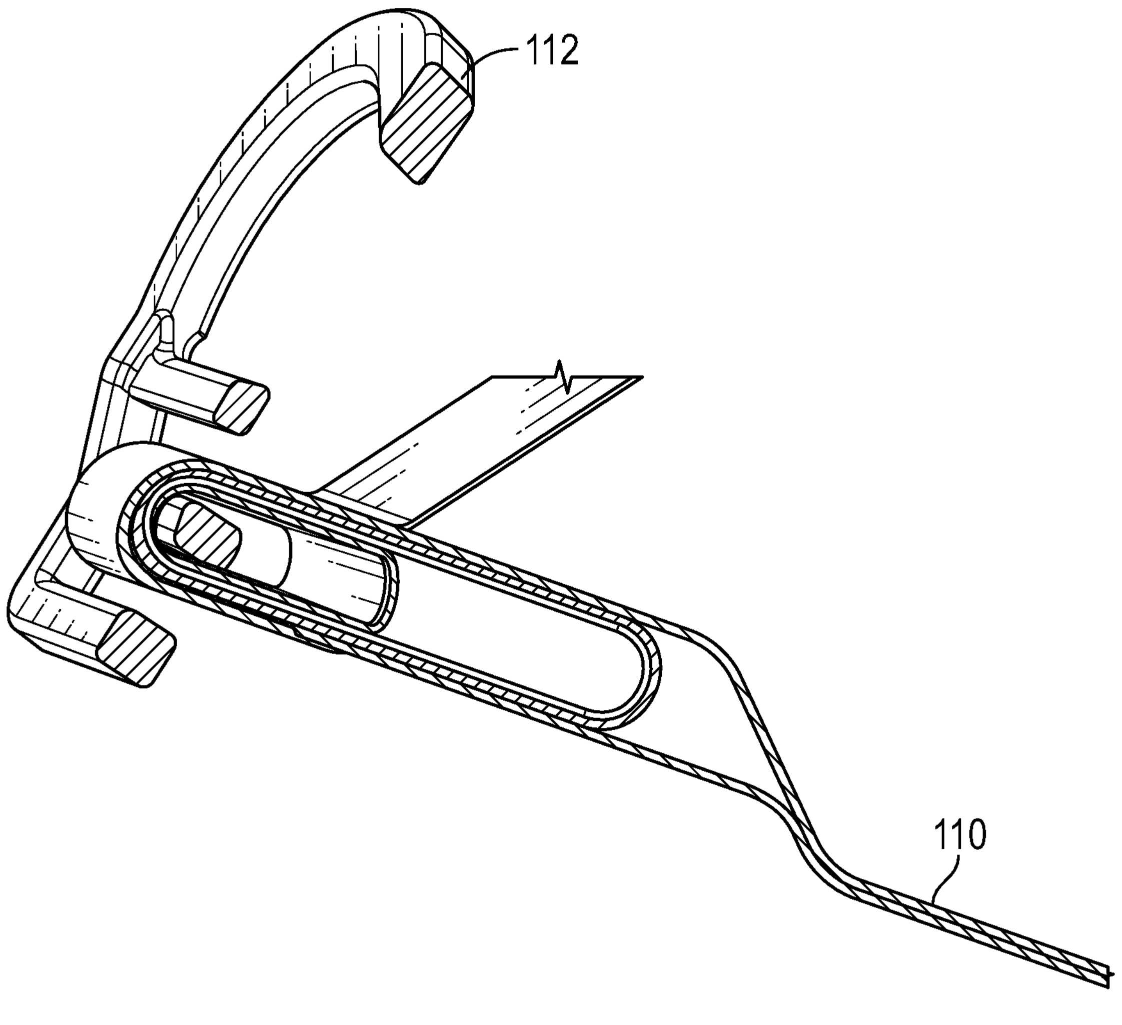
Figure 12C:
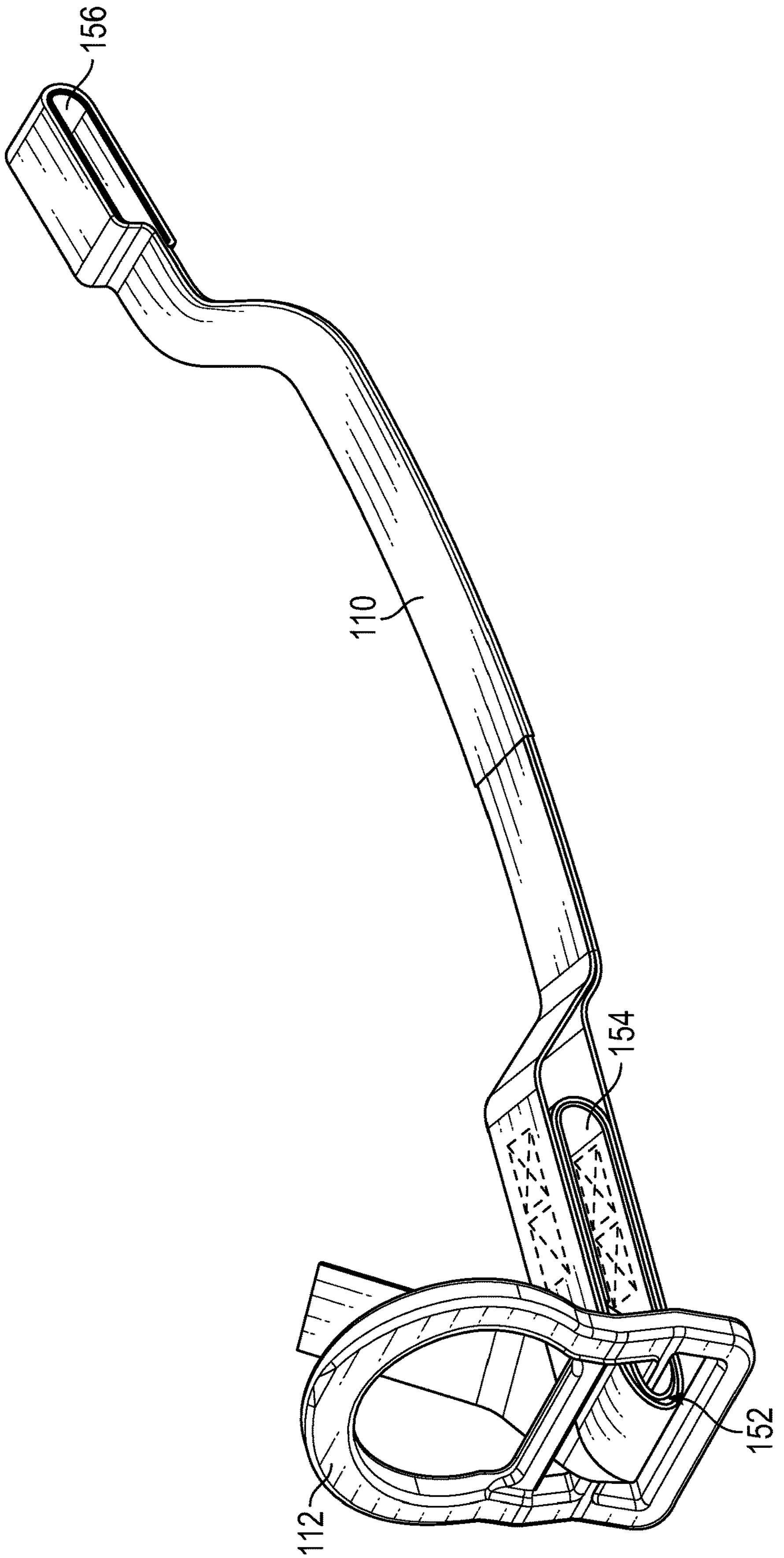

FIGS. 1-12C include various view of a harness 100 and portions of the harness 100 in accordance with example embodiments of the disclosed concept. FIG. 1 is a view of the back of a portion of the harness 100 and FIG. 2 is a view of the harness 100 with protective covers removed. FIGS. 3-5 are views an improved chest strap 102 of the harness 100. FIG. 6 is a view of the harness 100 including a tri-load capable hardware attachment 128. FIG. 7A-C are views of a torso strap to leg loop connection of the harness 100 and show the tri-load capable hardware attachment 128. FIG. 8 is a view of a pull cord 102 of the harness 10. FIGS. 9A-B and FIGS. 10A-B are views of a lockout system 106 of the harness 100. FIGS. 11A-B are views of directional tearaway feature 108 of the harness 100. FIGS. 12A-C are views of a triple connection point lanyard 108 of the harness 100.

The harness 100 includes a switchpoint features that allows the user to reposition the attachment point from the back to the front of the harness after a fall to improve the comfort of the user and enable the user to make efforts to rescue themself. The harness 100 includes several features which improve the strength, safety, and ease of use of the harness 100. In accordance with example embodiments of the disclosed concept, the harness 100 provides one or more of an improved chest strap 102, a tri-load capable hardware attachment 128, a pull cord designed 104 to interact with the harness system, a lockout system 106 built into a harness fall indicator switch, a directional tearaway feature 108, and a triple connection point lanyard 110. Various aspects of these features are described in more detail herein.

In accordance with some example embodiments of the disclosed concept, the harness 100 includes an improved chest strap 102. The chest strap (strap that crosses the strap on upper chest) on a fall protection harness is typically a separate strap that connects to the torso strap (vertical strap on the front side of the body). In the harness 100 in accordance with some example embodiments of the disclosed concept, the improved chest strap 102 is created by folding the torso strap to create a right angle. Current chest straps are typically manufactured with a loop at one end that captures the torso strap and allows the chest strap to slide. When the chest strap is used for sternal fall arrest, it requires additional webbing and stitching to maintain its position during a fall. In the harness 100 in accordance with some example embodiments of the disclosed concept, the improved chest strap 102 is created by folding the torso strap to redirect it by 90 degrees. FIGS. 3, 4, and 5 shows the sequence of how the improved chest strap 102 is created. In FIG. 3, a chest strap 120 is formed by folding one or more of the layers of webbing of a vertical torso strap at about a 45 degree angle with respect to the remaining layers of webbing of the torso strap. The completed fold it shown in FIG. 4. As shown in FIG. 4 the upper edge of the chest strap 120 created from one or more of the layers of webbing of the torso strap is perpendicular (at a 90 degree angle) with the vertical portion of the torso strap, and the chest strap 120 extends perpendicular with respect to the torso strap. A buckle 122 is also attached to the chest strap 120 by threading the chest strap 120 through the buckle 122. In FIG. 5, the complete improved chest strap 102 is shown. A stowage loop 124 may also be attached as shown in FIG. 5. FIGS. 1, 2, and 6 show additional views of the improved chest strap 102. The improved chest strap 102 allows the chest strap adjustment hardware to adjust to shorter lengths since the independent chest strap stitching was removed. This allows the user to feel more secure in the harness 100 and allows for less unwanted movement/stretch in the harness 100 when climbing with (or using for other means) the sternal attachment.

In accordance with some example embodiments of the disclosed concept, the harness 100 includes a tri-load capable hardware attachment 128. Fixed harness hardware is typically attached to a harness by passing an end of webbing through the hardware's anchor point and sewing the webbing end back on itself. Example embodiments of the disclosed concept introduce additional webbing to the connection to provide favorable loading when a third direction of loading is introduced. This is accomplished by using the tri-load capable harness hardware attachment 128 to redirect forces applied by the third direction of loading. The extra webbing uses friction created by the first two load directions to resist forces by the third load that could damage the anchoring stitching. Typical tri-load loading harness components require a circular webbing loop or additional external webbing to reduce peeling forces on stitching. Example embodiments of the disclosed concept package the webbing internally and creates significant internal friction to reduce the peeling force on the stitching.

The tri-load capable hardware attachment 128 includes a first element having first and second layers of webbing, a second element having an opening, and a third element having an opening. The tri-load capable hardware attachment is structured to attach the first element, the second element, and the third element and is structured to resist three directions of loading. The first webbing layer of the first element is looped through the opening of the second element and the opening of the third element and the second webbing layer of the first element is looped through the opening of the second element and the opening of the third element a first time and looped back through the opening of the second element a second time. The additional loop uses friction created by the first two load directions to resist forces by the third load that could damage the anchoring stitching.

The tri-load capable hardware attachment 128 may be employed at any attachment where loading in three directions may be applicable. In an example embodiment, the tri-load capable hardware attachment 128 is used where the torso strap joins the leg loop. FIG. 6 shows an example of the tri-load capable hardware attachment 128 located where the torso strap joins the leg loop. FIGS. 7A-7C provide additional views of an example embodiment of the tri-load capable hardware attachment 128. In this example embodiment, the torso strap 126 acts as the first element, the buckle 130 acts as the second element, and the leg loop 132 acts as the third element. As shown in FIG. 7A, the tri-load capable hardware attachment 128 is at the junction of a torso strap 126 and a leg loop 132. As shown in FIG. 7B, an extra loop from the torso strap 126 captures the leg loop 132. A buckle 130 is also attached to connect with corresponding buckles 130 elsewhere on the harness 100. In particular, the tri-load capable hardware attachment 128 is formed by looping one webbing layer of the torso strap 126 through the buckle 130 and the leg loop 132 and looping another webbing layer of the torso strap 126 through the buckle 130 and the leg loop 132 a first time and then looping it back through the buckle 130 a second time. FIG. 7C shows the completed tri-load capable hardware attachment 128. The tri-load capable hardware attachment 128 allows tri-direction loads on harness straps and strap intersections, and reduces peeling forces on stitching. Compared to a closed loop, the tri-load capable hardware attachment is easier to make on CNC sewing machines and can be made in a smaller size.

In some example embodiments, a tri-load capable hardware attachment may be employed at a junction between the chest strap 102, chest strap buckle 122, and chest strap D-ring 123. In this example embodiment of the tri-load capable hardware attachment, the first element is the chest strap 102, the second element is the chest strap buckle 122, and the third element is a chest strap D-ring 123. That is, a first layer of webbing of the chest strap 102 is looped through an opening of the chest strap buckle 122 and an opening of the chest strap D-ring 123, and a second layer of webbing of the chest strap 102 is looped through the opening of the chest strap buckle 122 and the opening of the chest strap D-ring 123 and then is looped back through the opening of the chest strap buckle 122 a second time. With this looping back through the opening of the chest strap buckle 122, forces applied in the third direction of the chest strap D-ring 123 will cause additional friction forces between the layers of webbing and reduce strain on any stitching.

In accordance with some example embodiments of the disclosed concept, the harness 100 includes a pull cord 104 designed to interact with the harness 100. The pull cord 104 has a feature with no open loops that could snag on objects accidentally, but can be engaged intentionally. The pull cord 104 can either be pulled to interact with the harness 100, or be extended to expose a more positive feature that can be used to apply force more easily. The pull cord 104 is used to deploy a user initiated feature of the harness 100. In some example embodiments of the disclosed concept, the pull cord 104 is used to deploy a switchpoint feature, allowing the attachment point to be moved from the back to the front of the harness 100. FIG. 8 shows an example of the pull cord 104. The pull cord 104 includes a pull cord first end 140 accessible by a user and disposed at a lower point of the harness 100 and extends through harness straps through a pull cord redirection attachment 146 attached to fall indicator stitching 148 located at a central portion of the harness 100. At the pull cord redirection attachment 146, the pull cord 104 is redirected back downward and extends through the release ring 142. The pull cord 104 continues extending past the release ring 142 to a pull cord second end sewn into a leg strap of the harness. The purpose of the pull cord 104 is to enable the user to pull on a release ring 142 via the pull cord 104 after a fall has occurred. During a fall, the fall indicator stitching 148 tears and releases the pull cord redirection attachment 146. This allows the pull cord first end 140 to be pulled downward until a middle section of the pull cord 104 engages the release ring 142. This engagement applies a mechanical advantage of 2:1 where the force input is at the pull cord first end 140 and the force output is the release ring 142. The force exerted on the release ring 142 causes the switchpoint feature to be deployed, for example by causing the D-ring 112 to be released from its position on the back and to move to a location in the front. However, it will be appreciated that the pull cord 104 may be adapted to deploy different harness features without departing from the scope of the disclosed concept.

In accordance with some example embodiments of the disclosed concept, the harness 100 includes a lockout system 106 built into the harness fall indicator stitching 148. The harness 100 includes a number of user initiated features structured to be activated by an action of the user. In an example embodiment, the user initiated feature is the switchpoint feature activated by the pull cord 104. However, it will be appreciated that other user initiated features may be used in the harness 100. The lockout system 106 is used to prevent activation of a selected user initiated feature until after a fall. For example, an element of the selected user initiated feature is attached, for example sewn, to the fall indicator stitching 148 such that the selected user initiated feature is unable to be activated by the action of the user until the fall indicator stitching is torn by a fall. Any system sewn into the fall indicator stitching 148 is prevented from engaging unless the fall indicator stitching 148 has broken.

In an example embodiment of the disclosed concept, the selected user initiated feature is the switchpoint feature activated by the pull cord 104. In this example embodiment, the pull cord redirection attachment 146 is the element attached to the fall indicator stitching 148. FIGS. 9A-B and 10A-B show this example embodiment of the lockout system 106 in more detail used with the pull cord 104. In this case, the lockout system 106 prevents the pull cord 104 from being used to deploy the switchpoint feature until after a fall and the fall indicator stitching 148 has torn. FIGS. 9A-B show the lockout system 106 before a fall, in which the fall indicator stitching 148 prevents the pull cord 104 from operating by securing the pull cord redirection attachment 146. FIGS. 10A-B show the lockout system 106 after a fall, in which the fall indicator stitching 148 has torn and the pull cord redirection attachment 146 is released and the pull cord 104 is able to be used to deploy the switchpoint feature. The lockout system 106 consists of the fall indicator stitching 148 which is torn apart by the force of a fall. Once the stitching has torn, the pull cord 104 is free to be pulled and engage the release ring 144. FIG. 2 shows an additional view of the lockout system 106. The lockout system 106 locks out engagement of user initiated harness features until after a fall with minimal cost. While the example embodiment is shown with respect to the switchpoint feature, it will be appreciated that the lockout system 106 may be employed with other user initiated harness features without departing from the scope of the disclosed concept.

In accordance with some example embodiments of the disclosed concept, the harness 100 includes a directional tearaway feature 108. The directional tearaway feature 108 uses stitch patterns and thread sizes to maintain the position of integrated features under loads of normal use, but will tear when body weight is applied in the appropriate direction. The directional tearaway feature 108 combines a load bearing anchor to maintain position of an integrated system and tearaway stitching that tears directionally at force below body weight. Other harnesses do not have stitching that is designed to tear at such low forces. FIGS. 11A-B show the direction tearaway feature 108 in more detail. The directional tearaway feature 108 includes tearaway stitching which attaches the lanyard 110 to the straps of the harness 100. The D-ring 112 is attached to the end of the lanyard 110. The tearaway stitching resists tearing when the D-ring 112 is pulled in a downward direction (with reference to FIG. 11B), but will tear when pulled in an upward direction (with reference to FIG. 11B) when the anchor strap 150 has been released by the user pulling the pull cord 104. When the user pulls the pull cord 104 to deploy the switchpoint feature, the lanyard 110 will move upward (with reference to FIG. 11B) during the transfer of the D-ring 112 from the back to the front of the harness 100. This is also the direction which allows the tearaway stitching to tear and release the lanyard 110 from where it is sewn to the straps of the harness 100. Thus, the directional tearaway feature 108 will retain the lanyard 110 against the straps of the harness 100 before the switchpoint feature is deployed, and will allow the lanyard 110 to tearaway from the straps of the harness 100 after the switchpoint feature is deployed. FIGS. 1, 2, and 6 show additional views of the directional tearaway feature 108. The directional tearaway feature 108 maintains the position of a system in a clean tamper evident way. It will tear with low forces (body weight) under the appropriate conditions.

In accordance with some example embodiments of the disclosed concept, the harness 100 includes a triple connection point lanyard 110. The triple connection point lanyard 110 allows for a lanyard to have three connection points compared to the standard two connection point lanyard. Any combination of two different connection points can be safely used. The triple connection point lanyard 110 uses a single strap and two load bearing stitch patterns, as is sometimes used in lanyards, but combines the ability to attach to multiple items on one end and safely load any combination of connections. FIGS. 12A-C include views of the triple connection point lanyard 110 used on the harness 100 in some example embodiments of the disclosed concept. The looping and stitching of the lanyard webbing as shown results in three distinct locations 152,154,156 for applying loads. The first location 152 is at the D-Ring 112. The second location 154 proximate the D-Ring 112. The third location 156 is at a distal end of the lanyard 110 and can be attached to the improved chest strap 102 as shown in FIG. 1. The triple connection point lanyard 110 uses a single strap and two load bearing stitch patterns, but combines the ability to attach to multiple items on one end and safely load any combination or connections.

In accordance with example embodiments of the disclosed concept, a harness provides one or more of the improved chest strap, the tri-load capable hardware attachment, the pull cord designed to interact with the harness system, the lockout system built into a harness fall indicator switch, the directional tearaway feature, and the triple connection point lanyard. It will be appreciated that the disclosed concept includes harnesses including, one several, or all of these features, and any combination of these features.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A harness for a fall protection system comprising:

a number of user initiated features structured to be activated by an action of a user;

a lockout system including fall indicator stitching structured to tear in response to a fall; and a pull cord structured to activate one of the user initiated features, wherein an element of the one of the-user initiated features is attached to the fall indicator stitching such that the one of the user initiated features is unable to be activated by the action of the user until the fall indicator stitching is torn, and wherein the pull cord includes a free pull cord end accessible by a user prior to the fall, and wherein the action, by the user, of pulling the free pull cord end after the fall activates the one of the user initiated features.

2. The harness of claim 1, wherein the one of the user initiated features is a switchpoint feature to allow an attachment point of the harness to be moved from a back to a front of the harness.

3. The harness of claim 1 wherein the pull cord extends through a release ring structured to activate the one of the user initiated features.

4. The harness of claim 3, wherein the element of the user initiated features is a pull cord redirection attachment attached to the fall indicator stitching, and wherein the pull cord extends from the free pull cord end through the release ring and through the pull cord redirection attachment to a pull cord second end attached to the harness, wherein the pull cord redirection attachment and fall indicator stitching prevent the pull cord from engaging the release ring when the fall indicator stitching is intact, and wherein the pull cord redirection attachment and the fall indicator stitching release and allow the pull cord to engage the release ring when the pull cord is pulled by the user after the fall.

5. The harness of claim 1, further comprising:

a directional tearaway feature including direction sensitive stitching that is structured to resist tearing in a first direction and be susceptible to tearing in a second direction.

6. The harness of claim 1, further comprising:

a lanyard composed of a single strap having three connection points.

7. The harness of claim 6, further comprising:

a directional tearaway feature including direction sensitive stitching that is structured to resist tearing in a first direction and be susceptible to tearing in a second direction, wherein the directional tearaway features includes direction sensitive stitching which attaches a portion of the lanyard to straps of the harness.

8. The harness of claim 1, further comprising:

a torso strap composed of a plurality of layers of webbing; and a chest strap composed of at least one of the plurality of layers of webbing of the torso strap folded to be disposed perpendicular with respect to the remaining of the plurality of layers of webbing of the torso strap.

9. The harness of claim 8, further comprising:

a buckle, wherein the chest strap is threaded through the buckle.

10. The harness of claim 8, wherein the at least one of the plurality of layers of webbing of the torso strap is folded at about 45 degrees with respect to the remaining of the plurality of layers of webbing of the torso strap.

11. The harness of claim 1, further comprising:

a first element;

a second element;

a third element; and a tri-load capable hardware attachment structured to attach the first element, the second element, and the third element, wherein the tri-load capable hardware attachment is structured to resist three directions of loading.

12. The harness of claim 11, wherein the tri-load capable hardware attachment includes a first webbing layer of the first element looped through an opening of the second element and an opening of the third element and a second webbing layer of the first element looped through the opening of the second element and the opening of the third element a first time and looped back through the opening of the second element a second time.

13. The harness of claim 12, wherein the first element is a torso strap, the second element is a buckle, and third element is a leg loop.

14. The harness of claim 12, wherein the first element is a chest strap, the second element is a chest strap buckle, and the third element is a chest strap D-ring.

15. A harness for a fall protection system comprising:

a first element;

a second element;

a third element; and a tri-load capable hardware attachment structured to attach the first element, the second element, and the third element, wherein the tri-load capable hardware attachment is structured to resist three directions of loading, wherein the tri-load capable hardware attachment includes a first webbing layer of the first element looped through an opening of the second element and an opening of the third element and a second webbing layer of the first element looped through the opening of the second element and the opening of the third element a first time and looped back through the opening of the second element a second time.

16. The harness of claim 15, wherein the first element is a torso strap, the second element is a buckle, and third element is a leg loop.

17. The harness of claim 15, wherein the first element is a chest strap, the second element is a chest strap buckle, and the third element is a chest strap D-ring.

18. A harness for a fall protection system comprising:

a torso strap composed of a plurality of layers of webbing;

a chest strap composed of at least one of the plurality of layers of webbing of the torso strap folded to be disposed perpendicular with respect to the remaining of the plurality of layers of webbing of the torso strap, the chest strap being a first element, wherein the at least one of the plurality of layers of webbing of the torso strap is folded at about 45 degrees with respect to the remaining of the plurality of layers of webbing of the torso strap, a second element;

a third element; and a tri-load capable hardware attachment structured to attach the first element, the second element, and the third element, wherein the tri-load capable hardware attachment is structured to resist three directions of loading, wherein the tri-load capable hardware attachment includes a first webbing layer of the first element looped through an opening of the second element and an opening of the third element and a second webbing layer of the first element looped through the opening of the second element and the opening of the third element a first time and looped back through the opening of the second element a second time.

* * * * *